United States Patent
Shirasaka

(10) Patent No.: US 6,879,982 B2
(45) Date of Patent: Apr. 12, 2005

(54) DATA MANAGEMENT SYSTEM, SERVER, AND DATA MANAGEMENT METHOD

(75) Inventor: Akifumi Shirasaka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 601 days.

(21) Appl. No.: 09/875,013

(22) Filed: Jun. 7, 2001

(65) Prior Publication Data

US 2001/0054045 A1 Dec. 20, 2001

(30) Foreign Application Priority Data

Jun. 13, 2000 (JP) .......................................... 2000-177446
Apr. 26, 2001 (JP) .......................................... 2001-130159

(51) Int. Cl.[7] .............................................. G06F 17/30
(52) U.S. Cl. .......................... 707/10; 707/102; 709/219; 709/227
(58) Field of Search .............................. 707/10, 103, 1, 707/8, 202, 203, 204, 102; 709/219, 227, 236, 238, 248; 395/444, 489, 200.08, 600

(56) References Cited

U.S. PATENT DOCUMENTS 5,935,206 A * 8/1999 Dixon et al. ................. 709/219
6,374,253 B1 * 4/2002 Weider et al. ............... 707/102
6,401,121 B1 * 6/2002 Yoshida et al. ............. 709/227

* cited by examiner

*Primary Examiner*—Charles Rones
(74) *Attorney, Agent, or Firm*—Fitzpatrick, Cella, Harper & Scinto

(57) ABSTRACT

A data management system which has a plurality of servers connected through a network and transfers data managed by each server in accordance with a request from a terminal connected to the server, wherein each server comprises recording means for recording the number of times of transfer of data managed by the server, which is requested from the terminal through another server, in association with the other server and the data, and copy means for copying the data to the other server for which the number of times exceeds a predetermined number.

20 Claims, 18 Drawing Sheets

FIG. 12A

| DOCUMENT : | DOCUMENT X |
|---|---|
| STORAGE POSITION : | SERVER G |
| ACCESS CODE : | abed |
| INDEX SERVER EN ROUTE : | |
| REQUEST SOURCE : | USER Y |

FIG. 12B

| DOCUMENT : | DOCUMENT X |
|---|---|
| STORAGE POSITION : | SERVER G |
| ACCESS CODE : | abed |
| INDEX SERVER EN ROUTE : | A1 |
| REQUEST SOURCE : | USER Y |

FIG. 12C

| DOCUMENT : | DOCUMENT X |
|---|---|
| STORAGE POSITION : | SERVER G |
| ACCESS CODE : | abed |
| INDEX SERVER EN ROUTE : | A1-A |
| REQUEST SOURCE : | USER Y |

FIG. 13

ACCESS INFORMATION

| DOCUMENT | SERVER A | SERVER B | INDEX SERVER EN ROUTE | | | |
| --- | --- | --- | --- | --- | --- | --- |
| | | | SERVER C | SERVER A1 | SERVER A2 | ... |
| DOCUMENT 1 | 5 | 4 | 0 | 4 | 1 | ... |
| DOCUMENT 2 | 3 | 3 | 2 | 1 | 2 | ... |
| DOCUMENT 3 | 7 | 0 | 8 | 2 | 5 | ... |
| DOCUMENT 4 | 2 | 0 | 1 | 0 | 2 | ... |
| ... | ... | ... | ... | ... | ... | ... |

FIG. 18

ROUTE INDEX INFORMATION

| REQUEST SOURCE | INDEX SERVER EN ROUTE |
|---|---|
| USER COMPUTER OF GROUP A1 | SERVER A1 - SERVER A |
| USER COMPUTER OF GROUP A2 | SERVER A2 - SERVER A |
| USER COMPUTER OF GROUP B1 | SERVER B1 - SERVER B |
| USER COMPUTER OF GROUP B2 | SERVER B2 - SERVER B |
| USER COMPUTER OF GROUP C1 | SERVER C1 - SERVER C |
| USER COMPUTER OF GROUP C2 | SERVER C2 - SERVER C |

DATA MANAGEMENT SYSTEM, SERVER, AND DATA MANAGEMENT METHOD

FIELD OF THE INVENTION

The present invention relates to a data management system for transferring data between servers on a network, a server, and a data management method.

BACKGROUND OF THE INVENTION

In a large-scaled data management system, one server may have data of documents and the like that are frequently accessed from many users. In this case, to distribute the load, generation of a plurality of apparatuses called mirror servers for holding identical data contents has been proposed. When such mirror servers are used, a user who requires a document or the like on the original server can extract the document or the like from an appropriate mirror server, and the load can be distributed.

However, even when mirror servers are installed, most users cannot determine which mirror server can be efficiently accessed. In addition, when mirror servers are generated, the maintenance cost becomes high.

SUMMARY OF THE INVENTION

It is an object of the present invention to avoid load concentration to a specific server and improve the access efficiency.

According to the present invention, there is provided a data management system which has a plurality of servers connected through a network and transfers data managed by each server in accordance with a request from a terminal connected to the server, wherein each server comprises recording means for recording the number of times of transfer of data managed by the server, which is requested from the terminal through another server, in association with the other server and the data, and copy means for copying the data to the other server for which the number of times exceeds a predetermined number.

According to the present invention, there is also provided a server which is connected to another server through a network and transfers data managed by the server in accordance with a request from a terminal connected to the other server, comprising:

recording means for recording the number of times of transfer of data managed by the server, which is requested from the terminal through the other server, in association with the other server and the data; and copy means for copying the data to the other server for which the number of times exceeds a predetermined number.

According to the present invention, there is also provided a data management method of, for a plurality of servers connected through a network, transferring data managed by each server in accordance with a request from a terminal connected to the server, comprising:

the recording step of, in each server, recording the number of times of transfer of data managed by the server, which is requested from the terminal through another server, in association with the other server and the data; and the copy step of copying the data to the other server for which the number of times exceeds a predetermined number.

According to the present invention, there is also provided a program for causing a computer, which is connected to another server through a network and transfers data managed by the computer in accordance with a request from a terminal connected to the other server, to function as:

recording means for recording the number of times of transfer of data managed by the server, which is requested from the terminal through the other server, in association with the other server and the data; and copy means for copying the data to the other server for which the number of times exceeds a predetermined number.

According to the present invention, there is also provided a data management system which has a plurality of servers connected through a network and transfers data managed by each server in accordance with a request from a terminal connected to the server, wherein the data is managed in an object format, the object contains the data, a management method, and management data, each server comprises means for executing processing defined in the management method, and the management method defines processing of recording the number of times of transfer of data managed by the server, which is requested from the terminal through another server, as the management data in association with the other server and the data, and processing of copying the object of the data to the other server for which the number of times exceeds a predetermined number.

According to the present invention, there is also provided a server which is connected to another server through a network and transfers data managed by the server in accordance with a request from a terminal connected to the other server, wherein the data is managed in an object format, the object contains the data, a management method, and management data, the server comprises means for executing processing defined in the management method, and the management method defines processing of recording the number of times of transfer of data managed by the server, which is requested from the terminal through another server, as the management data in association with the other server and the data, and processing of copying the object of the data to the other server for which the number of times exceeds a predetermined number.

According to the present invention, there is also provided a data management method of, for a plurality of servers connected through a network, transferring data managed by each server in accordance with a request from a terminal connected to the server, wherein:

the data is managed in an object format, the object contains the data, a management method, and management data, the data management method comprises the step of executing processing defined in the management method, and the management method defines processing of recording the number of times of transfer of data managed by the server, which is requested from the terminal through another server, as the management data in association with the other server and the data, and processing of copying the object of the data to the other server for which the number of times exceeds a predetermined number.

According to the present invention, there is also provided a data management system which has a plurality of servers connected through a network and having a hierarchical relationship and transfers data managed by each server in accordance with a request from a terminal connected to the server, wherein the terminal is assigned to one of lowermost servers, and each server comprises specifying means for, when transfer of the data managed by the server to the terminal is requested, specifying another server present between the server and the terminal, recording means for recording the number of times of transfer of data managed by the server in association with the specified other server and the data, and copy means for copying the data to the other server for which the number of times exceeds a predetermined number.

According to the present invention, there is also provided a data management method of, for a plurality of servers connected through a network and having a hierarchical relationship, transferring data managed by each server in accordance with a request from a terminal connected to the server, wherein the terminal is assigned to one of lowermost servers, and the method comprises, for each server, the specifying step of, when transfer of the data managed by the server to the terminal is requested, specifying another server present between the server and the terminal, the recording step of recording the number of times of transfer of data managed by the server in association with the specified other server and the data, and the copy step of copying the data to the other server for which the number of times exceeds a predetermined number.

According to the present invention, there is also provided a server which is connected to a plurality of servers through a network, has a hierarchical relationship with respect to the plurality of servers, and transfers to a terminal data managed by the server in accordance with a request from the terminal, wherein the terminal is assigned to one of lowermost servers, and the server comprises specifying means for, when transfer of the data managed by the server to the terminal is requested, specifying another server present between the server and the terminal, recording means for recording the number of times of transfer of data managed by the server in association with the specified other server and the data, and copy means for copying the data to the other server for which the number of times exceeds a predetermined number.

According to the present invention, there is also provided a program executed by a server which is connected to a plurality of servers through a network, has a hierarchical relationship with respect to the plurality of servers, and transfers to a terminal data managed by the server in accordance with a request from the terminal, wherein the terminal is assigned to one of lowermost servers, and the program causes the server to function as specifying means for, when transfer of the data managed by the server to the terminal is requested, specifying another server present between the server and the terminal, recording means for recording the number of times of transfer of data managed by the server in association with the specified other server and the data, and copy means for copying the data to the other server for which the number of times exceeds a predetermined number.

According to the present invention, there is also provided a data management system which has a plurality of servers connected through a network and transfers data managed by each server in accordance with a request from a terminal connected to the server, wherein each server comprises recording means for recording log information containing at least information related to the number of times of transfer of the data managed by the server, which is requested from the terminal through another server, and means for copying or moving the data managed by the server to the other server on the basis of the log information.

According to the present invention, there is also provided a server used in a data management system which has a plurality of servers connected through a network and transfers data managed by each server in accordance with a request from a terminal connected to the server, comprising:

recording means for recording log information containing at least information related to the number of times of transfer of the data managed by the server, which is requested from the terminal through another server; and means for copying or moving the data managed by the server to the other server on the basis of the log information.

According to the present invention, there is also provided a data management method in a system which has a plurality of servers connected through a network and transfers data managed by each server in accordance with a request from a terminal connected to the server, comprising:

the recording step of, in each server, recording log information containing at least information related to the number of times of transfer of the data managed by the server, which is requested from the terminal through another server; and the step of copying or moving the data managed by the server to the other server on the basis of the log information.

According to the present invention, there is also provided a program for causing a server used in a data management system, which has a plurality of servers connected through a network and transfers data managed by each server in accordance with a request from a terminal connected to the server, to function as recording means for recording log information containing at least information related to the number of times of transfer of the data managed by the server, which is requested from the terminal through another server, and means for copying or moving the data managed by the server to the other server on the basis of the log information.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 12A to 12C are views showing examples of information attached in acquiring a document;

FIG. 13 is a view showing access information;

FIG. 18 is a view showing pieces of information of server groups that are present between a user computer and each server group.

DETAILED DESCRIPTION OF THE PREFERRED EMBODIMENTS

Preferred embodiments of the present invention will now be described in detail in accordance with the accompanying drawings.

<First Embodiment>

Figure 1:
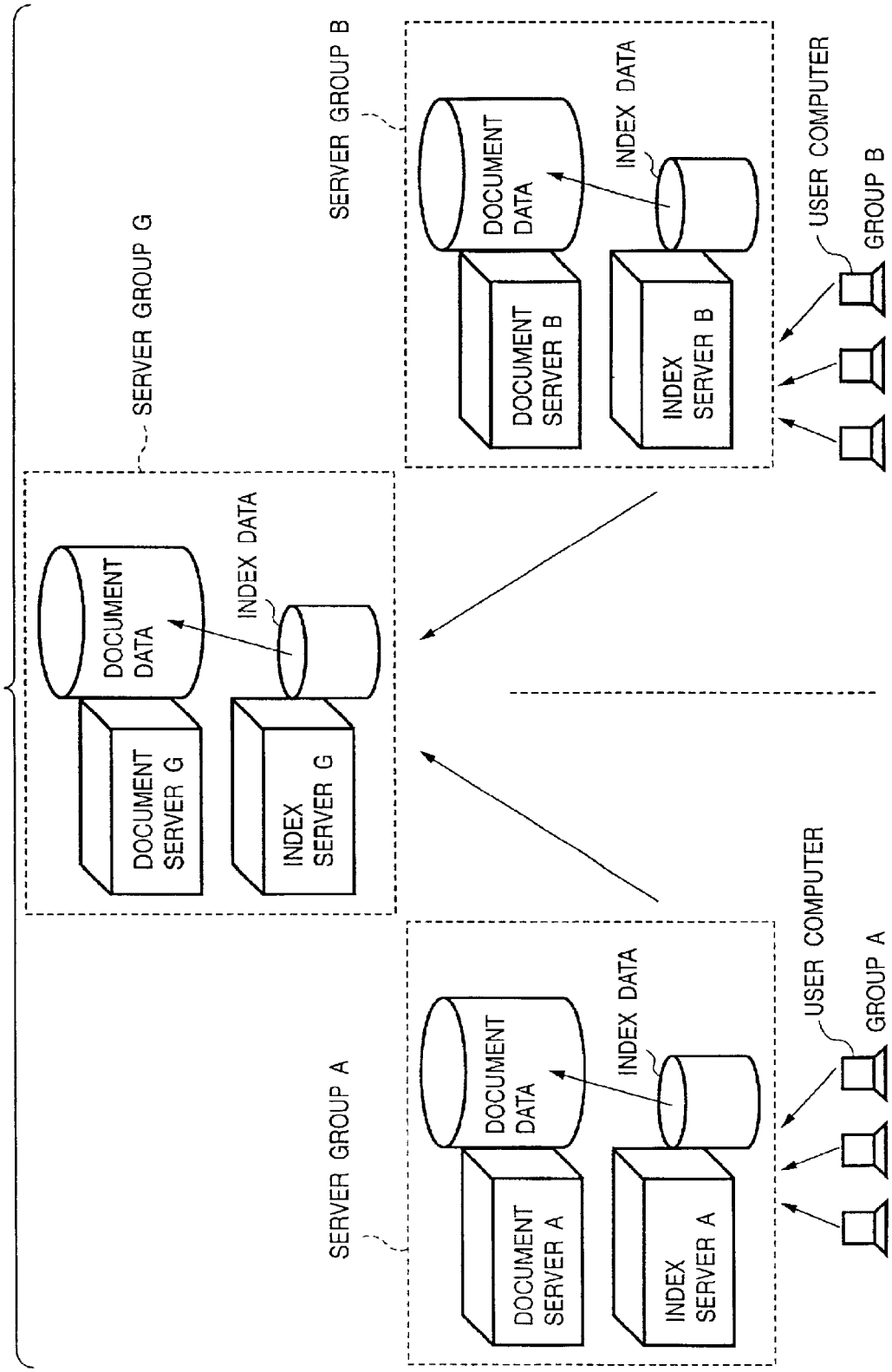
FIG. 1 is a schematic view of a data management system according to the first embodiment of the present invention.

FIG. 1 is a schematic view of a data management system according to the first embodiment of the present invention. This data management system executes document data search and the like.

The data management system has a hierarchical structure in which server groups A and B are set under an upper server group G. FIG. 1 shows the hierarchical relationship between the server groups. Communication can be performed between the servers, between the server groups, or between each server and each user computer.

Each of the server groups (A, B, and G) has document data, a document server for managing the document data, index data as indices of the document data, and an index server for managing the index data. The index server contains information such as document names and keywords.

A user computer (terminal) of a group A inquires of an index server A whether desired document data is registered in the group A (server group A). The index server A and document server A mainly hold document data that can be accessed only from the members of the group A and answer inquiries from the users of the group A. Document data that can be commonly accessed from both the members of the group A and those of the group B are mainly managed by index server G and document server G of the server group G. When a user of the group A inquires of the index server A whether desired document data is registered from the commonly accessible documents, the index server A inquires of the index server G about it.

Figure 2:
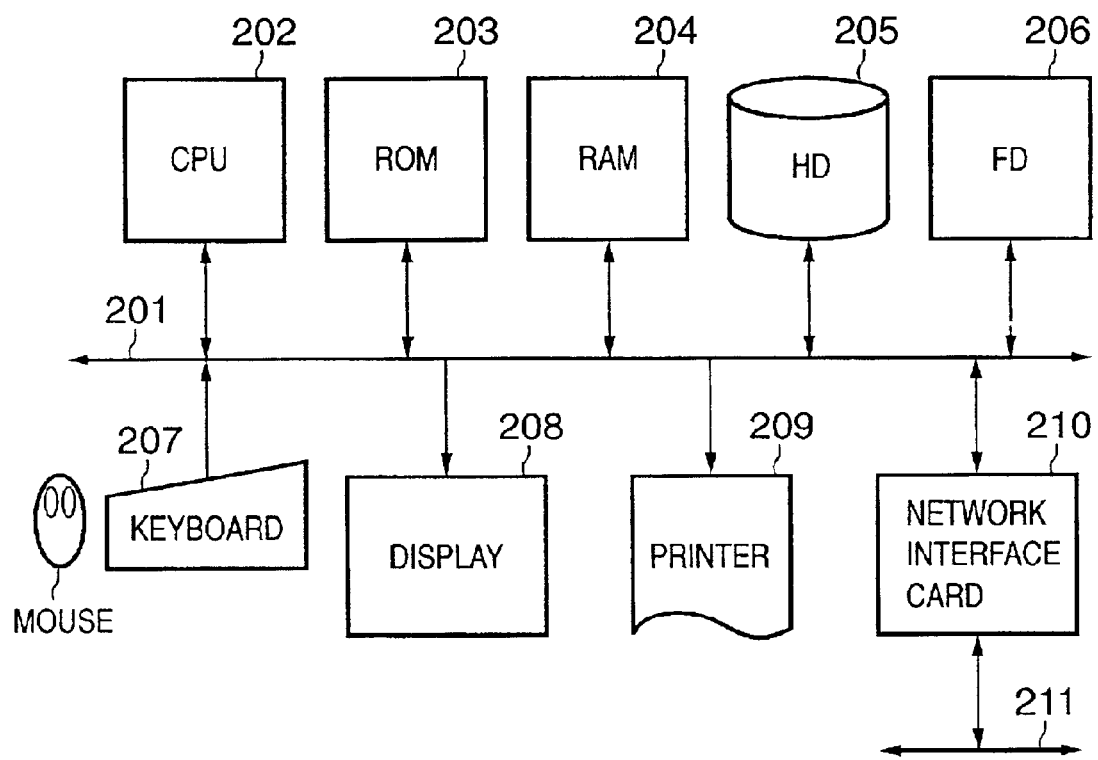
FIG. 2 is a block diagram showing the hardware configuration of each of the servers and user computers.

FIG. 2 is a block diagram showing the hardware configuration of the above-described document server, index server, or user computer.

A CPU 202 controls each server or the entire computer and executes document search request processing, document search processing, document read processing, and the like in accordance with, e.g., flow charts to be described later. A ROM 203 stores a fixed program necessary to activate the OS of the system or access each device.

A RAM 204 is used to temporarily store a program obtained through a hard disk (HD) 205 or network interface card 210 or data necessary to execute the program. A floppy disk device (FD) 206 is used to load a program from a floppy disk or read/write another data. A keyboard and mouse 207 are input devices with which the user inputs data.

A display 208 displays a document or the state of the system. A printer 209 prints a document and the like on a paper sheet. The network interface card 210 transmits/receives data related to search, extraction, and registration of document data through a network cable 211 and implements communication between the servers and communication between each server and each user computer. These devices exchange data through a system bus 201.

Figure 3:
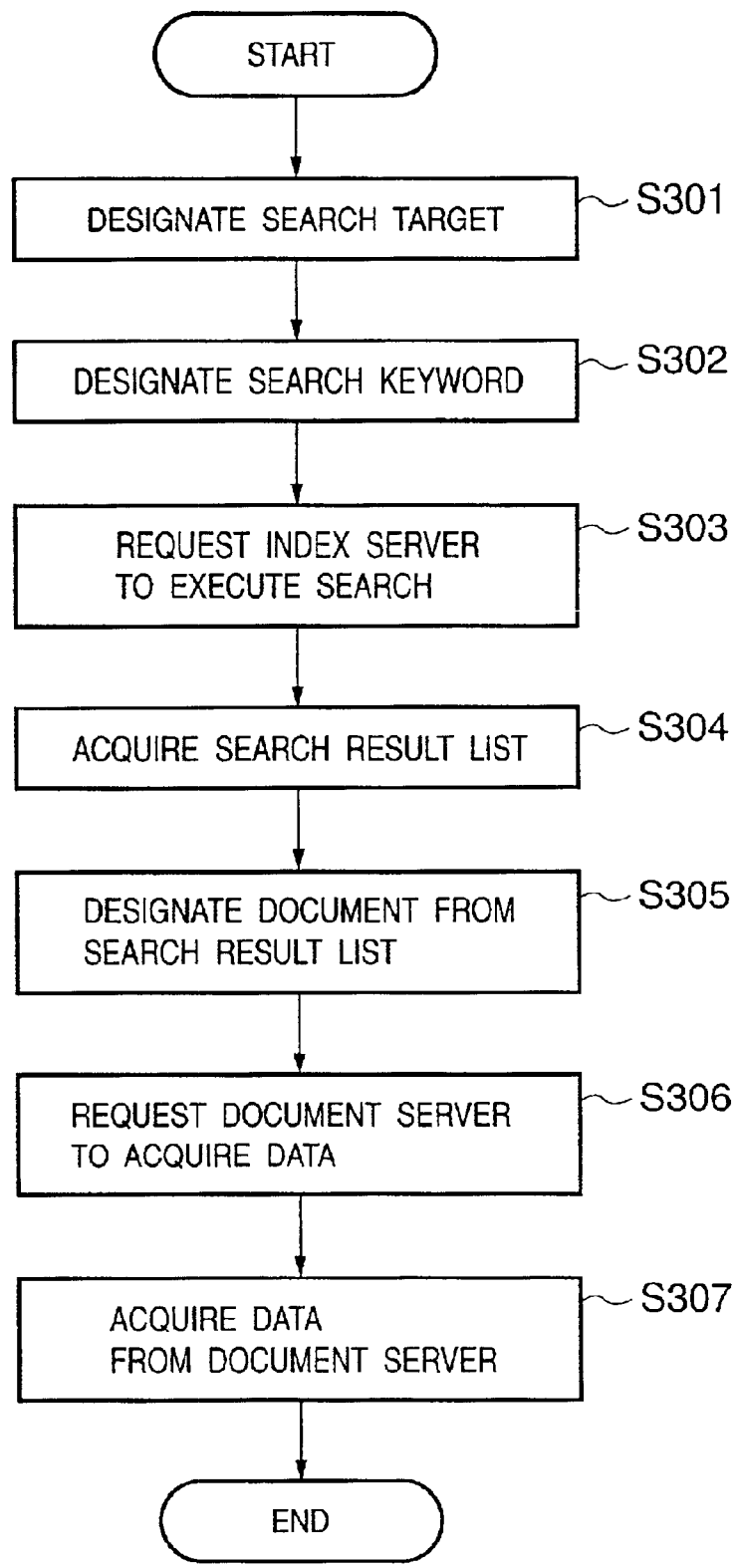
FIG. 3 is a flow chart showing processing in the user computer.

A method of causing a user to search for and extract document data for the server will be described next with reference to FIG. 3. FIG. 3 is a flow chart showing processing in the user computer.

In step S301, the user designates the search target. The user designates whether only documents stored in the document server (A or B) in the group to which the user belongs are to be searched, or whether documents stored in the upper document server (G) are also to be searched. In step S302, a keyword related to the document to be searched for is designated. The keyword is information related to the document such as the title, theme, or project name of the document.

In step S303, a search request is issued to the index server (A or B) in the group to which the user belongs to together with the search target information and keyword information designated in steps S301 and S302. The index server executes search in accordance with the procedure shown in FIG. 4 (to be described later) and acquires a document list as the search result in step S305.

In step S305, when the document wanted by the user is present in the search result list, the document is selected. In step S306, a data acquisition request is issued to the document server in which the document is stored. This acquisition request is sent to the document server (A or B) or document server G through the index server (A or B) or through the index server (A or B) and index server (G). The acquisition request may be directly sent from the user computer to the document server G. In step S307, the actual document data is acquired into the user computer.

Figure 4:
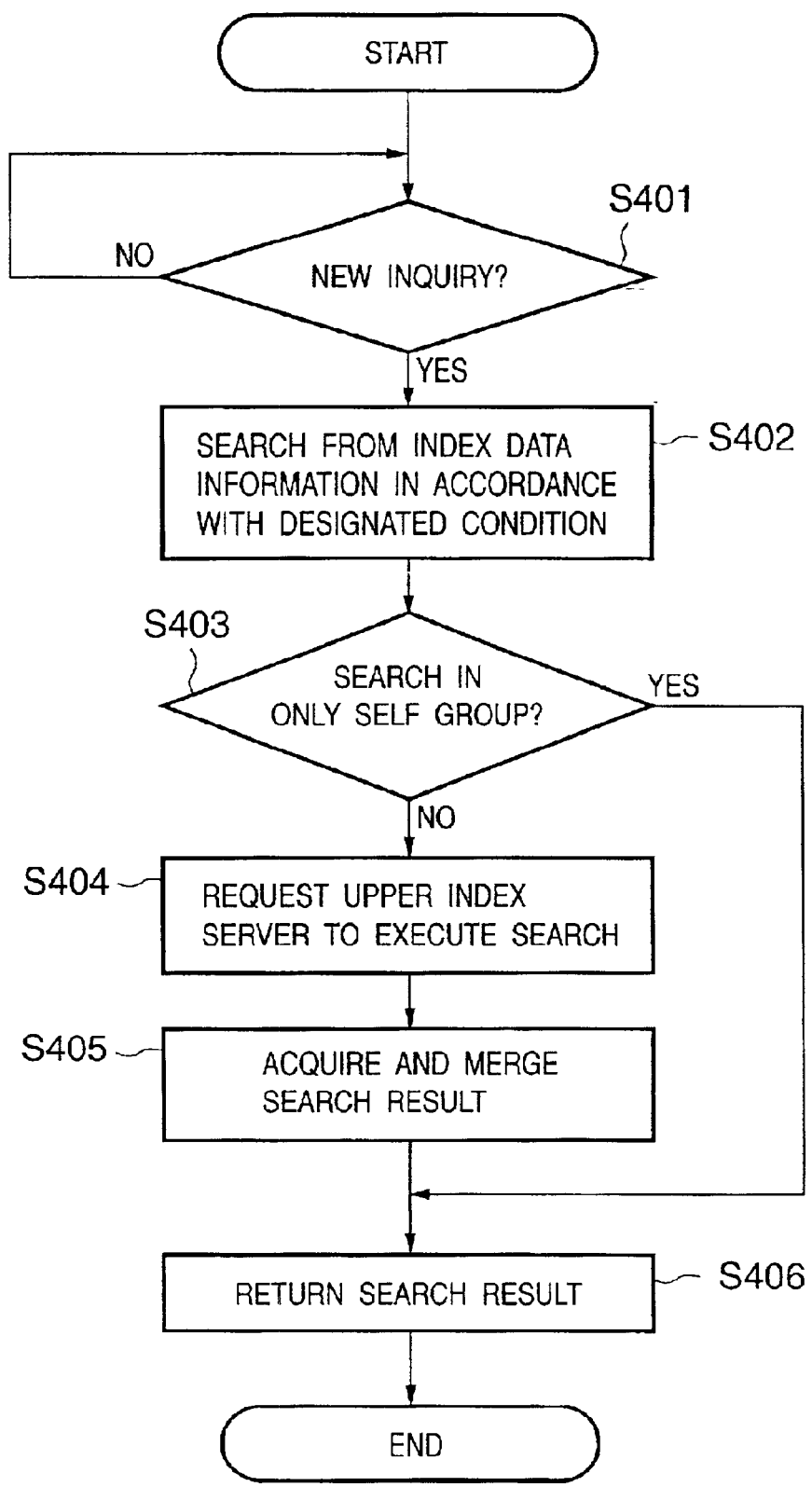
FIG. 4 is a flow chart showing document search processing by an index server.

A method of causing the index server to search for a document will be described next with reference to FIG. 4. FIG. 4 is a flow chart showing document search processing by the index server.

Step S401 represents that the index server is waiting for a search request from a user computer. In step S402, in response to a search request from a user computer, the index server executes document search by referring to index data held by the index server itself. In step S403, it is determined whether the search request contains not only a search request for the data held by the index server itself but also a search request for data in the upper server group G. If the data in the server group G need also be searched, the search request is sent to the upper index server G in step S404.

In step S405, the search result obtained from the upper index server G is merged with information extracted from the index data of the index server itself. In step S406, the result is returned to the user computer that has requested search.

Figure 5:
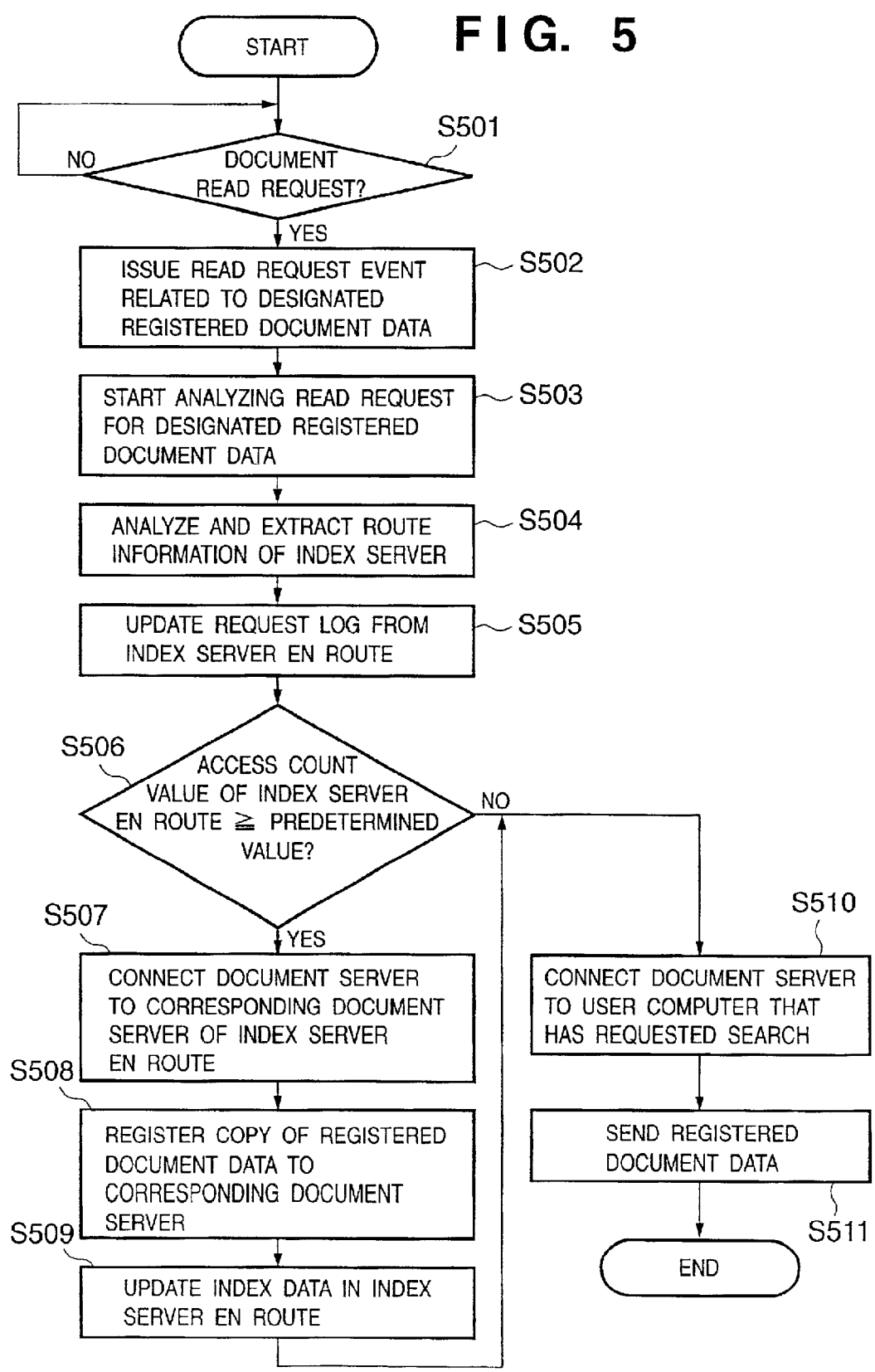
FIG. 5 is a flow chart showing processing in a server group that has received a read request.

Processing executed by a server group that has received a document data read request will be described next with reference to FIG. 5. FIG. 5 is a flow chart showing processing in the server group that has received a read request. A case wherein a user of the group A requests document data in the server group G will be described.

Step S501 represents that the index server is waiting for a read request for a document stored in the document server G. In step S502, the index server G that has received a read request sends to the document server G a read request event containing information representing which server or user computer has issued the read request and the route and authority of the read request.

In step S503, the document server G receives and starts analyzing the read request event. In step S504, information representing which index server has sent the search result list on which the request is based and whether the request is sent through one or more index servers is analyzed/extracted.

In step S505, the access count value is updated for each of the index servers en route. The access count value is incremented in accordance with the number of times and frequency of access and recorded for each document data. In this case, of the access count values recorded for the requested document data, the access count value related to the server group A is incremented.

In step S506, it is determined whether the updated access count value exceeds a preset value. When the number of access requests from the index server en route exceeds the predetermined value, the document server is connected to the document server belonging to the index server en route. In this case, the document server G is connected to the document server A.

In step S508, the document data is sent to the document server A and copied by the document server A. In step S509, new index data related to the copied document data is registered in the index server A en route. The new index data is information representing that the document in the upper server group G is present in the lower server group A. In step S510, the document server is connected to the user. In step S511, the actual document data of the registered document data is transferred to the user, and the processing is ended.

In this way, when the lower server group A often sends a request for registered document data managed by the upper server group G, the document data is copied by the server group A. Then, the document data can be returned from the server group A to the user, and load concentration can be avoided. In addition, the user can extract desired document data from the server group A with a higher access efficiency.

In the above embodiment, registered document data is copied. However, when a copy is temporarily formed at the site frequently accessed, and then, a delete request for the registered document data in the original server group is sent to move the storage position, only the access efficiency can be improved.

In this case, the registered document data stored in the index server G and document server G are temporarily registered in the server group A. After both the index data on the index server A and the index data on the index server G are rewritten to indicate the registered document data on the document server A, the registered document data on the document server G is erased.

<Second Embodiment>

Figure 6:
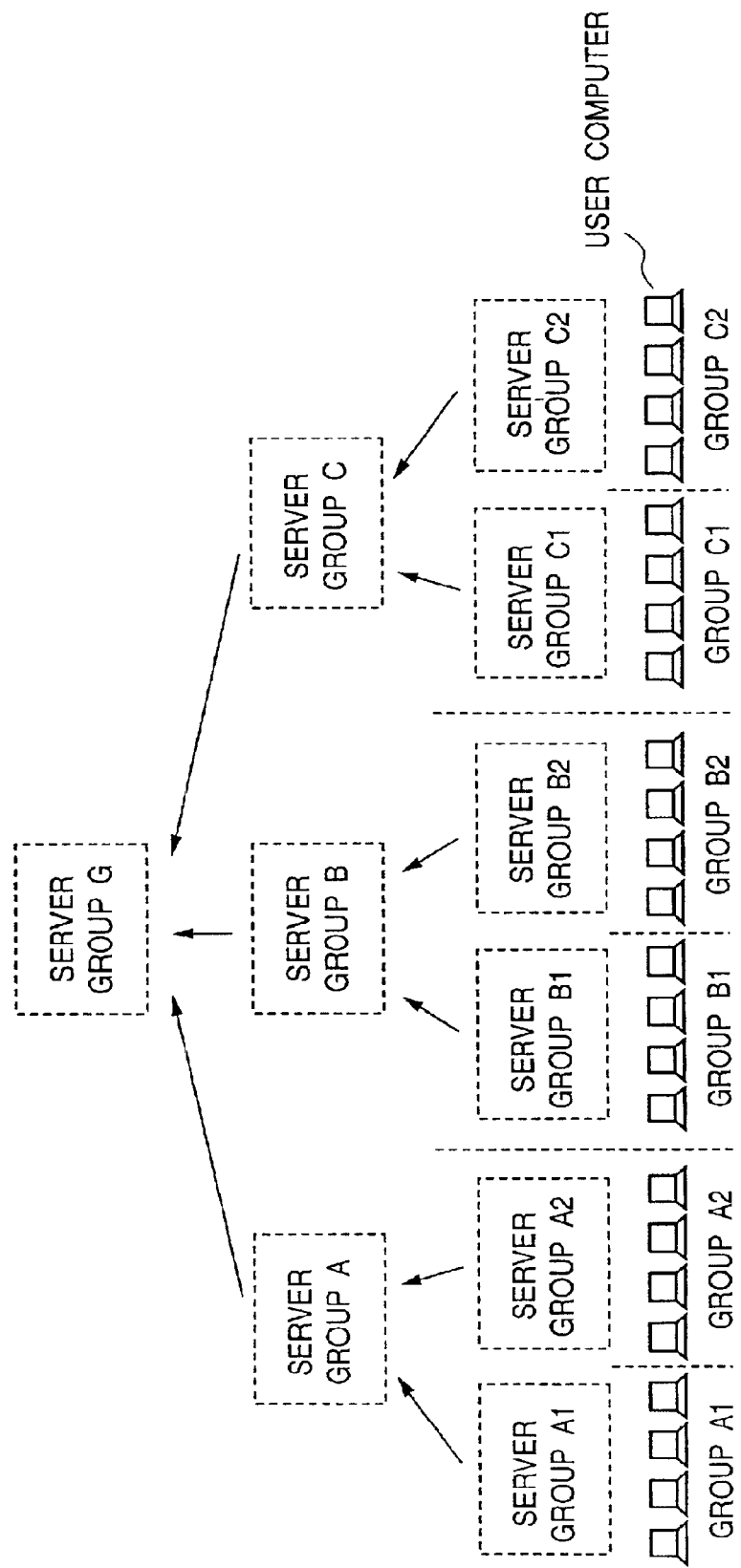
FIG. 6 is a schematic view of a data management system according to the second embodiment.

Execution of the above-described first embodiment in a system having a scale larger than that of the data management system shown in FIG. 1 will be described next. FIG. 6 is a schematic view of a data management system according to the second embodiment of the present invention.

The data management system shown in FIG. 6 has a hierarchical structure in which server groups A to C are set under an upper server group G, and server groups A1 and A2, B1 and B2, and C1 and C2 are set under the server groups A to C, respectively. As is apparent, the system shown in FIG. 6 has a larger scale as that of the system shown in FIG. 1 because the number of layers is larger. FIG. 6 shows the hierarchical relationship between the server groups. Communication can be performed between the servers, between the server groups, or between each server and each user computer.

Each server group has a document server for managing the contents of document data and an index server for managing index data as the index of the document data, as in the first embodiment. However, each server may be formed from a single server that integrates the document server and index server. The index data contains information such as a document name and keyword.

User computers are grouped into the lowermost server groups A1 to C2. For example, the user computers of the group A1 can request the server group A1 to, e.g., search for a document. Each of the above-described servers and user computers employs, e.g., the same hardware configuration as that shown in FIG. 2.

Figure 7:
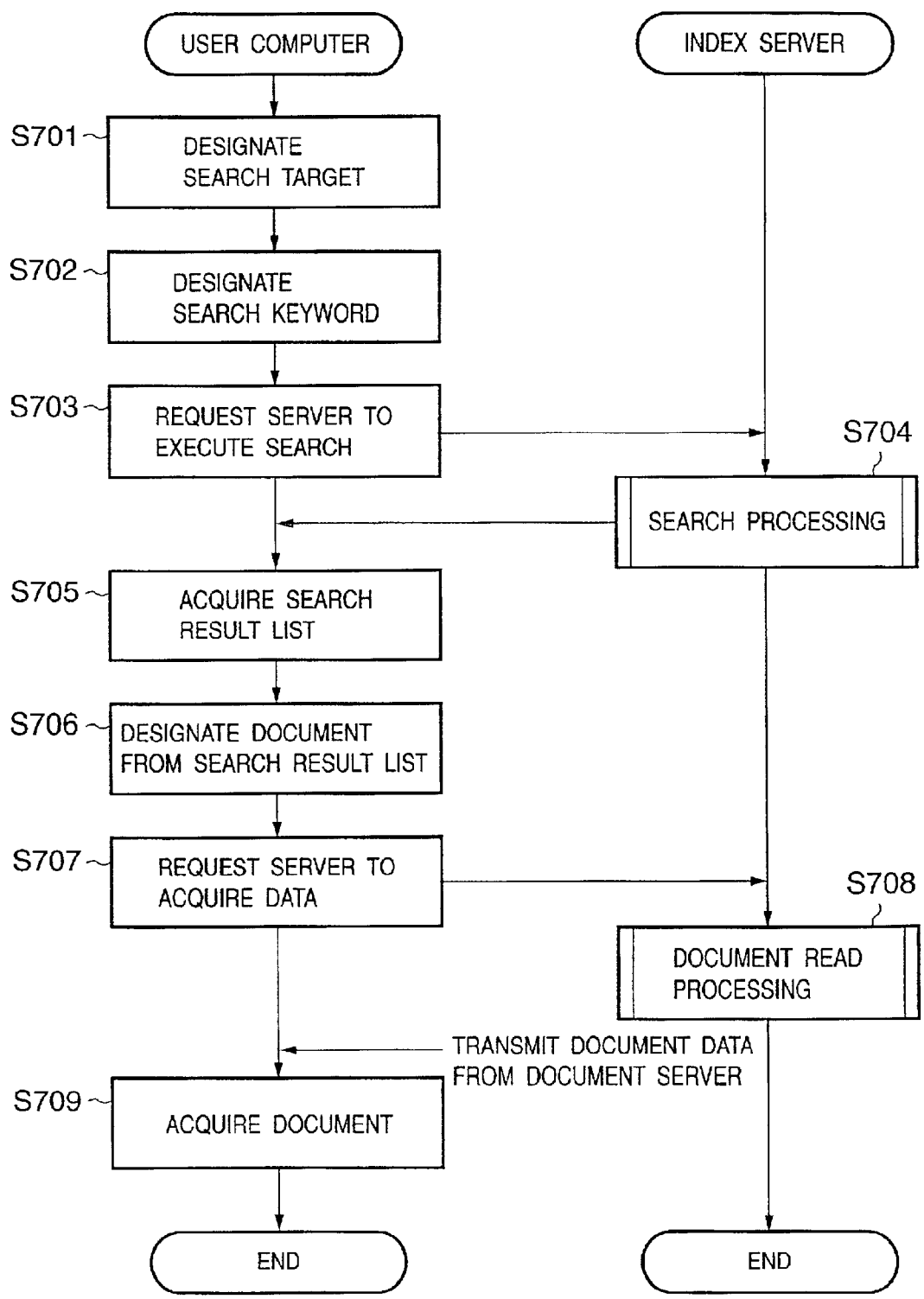
FIG. 7 is a flow chart showing processing in the second embodiment when a document stored in a document server is searched for and acquired by a user computer.

Processing when a document stored in the document server of the above-described server group is searched for and acquired by a user computer will be described next with reference to the flow chart shown in FIG. 7. A case wherein a document is searched for and acquired by a user computer belonging to the group A1 will be described.

In step S701, the user designates the search target in the user computer. The user designates a server to be searched. For example, the user designates whether only the server group A1 corresponding to the user computers belonging to the group A1 or whether the upper server group A or G are also to be searched.

In step S702, the user designates a keyword related to the document to be searched for. The keyword to be designated is, e.g., the title, theme, or project name of the document. In step S703, a search instruction is sent to the index server together with the search target designated in step S701 and the keyword designated in step S702 to request the index server to execute search. The user computer belonging to the group A1 sends the search instruction to the index server A1 of the server group A1.

In step S704, the index server (A1) that has received the search instruction from the user computer executes search processing (to be described later) and sends the search result list to the user computer. In step S705, the user computer receives the search result list sent from the index server (A1).

In step S706, in the user computer, the document wanted by the user is designated from the search result list. In step S707, an acquisition instruction for the document designated in step S706 is sent to the index server (A1) to request it to acquire the document.

In step S708, the index server (A1) that has received the document acquisition instruction from the user computer executes document read processing (to be described later). As a consequence, the document data is sent from the document server which stores the document designated in step S706 to the user computer. In step S709, the user computer receives the document data sent from the document server, and the processing is ended.

The search processing in step S704 and other index server processing related to the search processing will be described next with reference to the flow chart shown in FIG. 8. A case wherein the index server A1 receives the search instruction from the user computer will be described. This also applies to other index servers.

In step S801, the index server A1 that has received the search instruction from the user computer executes search using the keyword designated by the user and attached to the search instruction on the basis of index data managed by the index server A1. In step S802, the search target attached to the search instruction is checked to determine whether the upper server group is designated. If NO in step S802, the flow advances to step S805. If YES in step S802, the flow advances to step S803.

In step S803, a search request is transmitted to the upper index server A of the index server A1. The search target and keyword attached to the search instruction transmitted from the user computer in the above-described step S703 are attached to the search request. In step S806, the index server A that has received the search request executes search using the keyword designated by the user and attached to the search request on the basis of the index data managed by the index server A, as in the above-described processing in step S801.

In step S807, the index server A checks the search target attached to the search request to determine whether the upper server group is designated, as in the above-described processing in step S802. If NO in step S807, the flow advances to step S810. If YES in step S807, the flow advances to step S808.

In step S811, the index server A transmits the search request to the upper index server G. The keyword attached to the search instruction transmitted from the index server A1 in the above-described step S803 is attached to the search request. In step S811, the index server G that has received the search request executes search using the keyword designated by the user and attached to the search request on the basis of the index data managed by the index server G, as in the above-described processing in step S801.

In step S812, the index server G returns the result of search executed in step S811 to the index server A. In step S809, the index server A receives the search result from the index server G and merges the received search result with the result of search executed in step S806. In step S810, the result of search executed in step S806 or the search result merged in step S809 is returned to the index server A1.

In step S804, the index server A1 receives the search result from the index server A and merges the received search result with the result of search executed in step S801. In step S805, the result of search executed in step S801 or the search result merged in step S809 is returned to the user computer that has issued the search instruction. The search result contains, e.g., the document name and the server that stores the document in a list format. The search processing is ended in this way.

Figure 9:
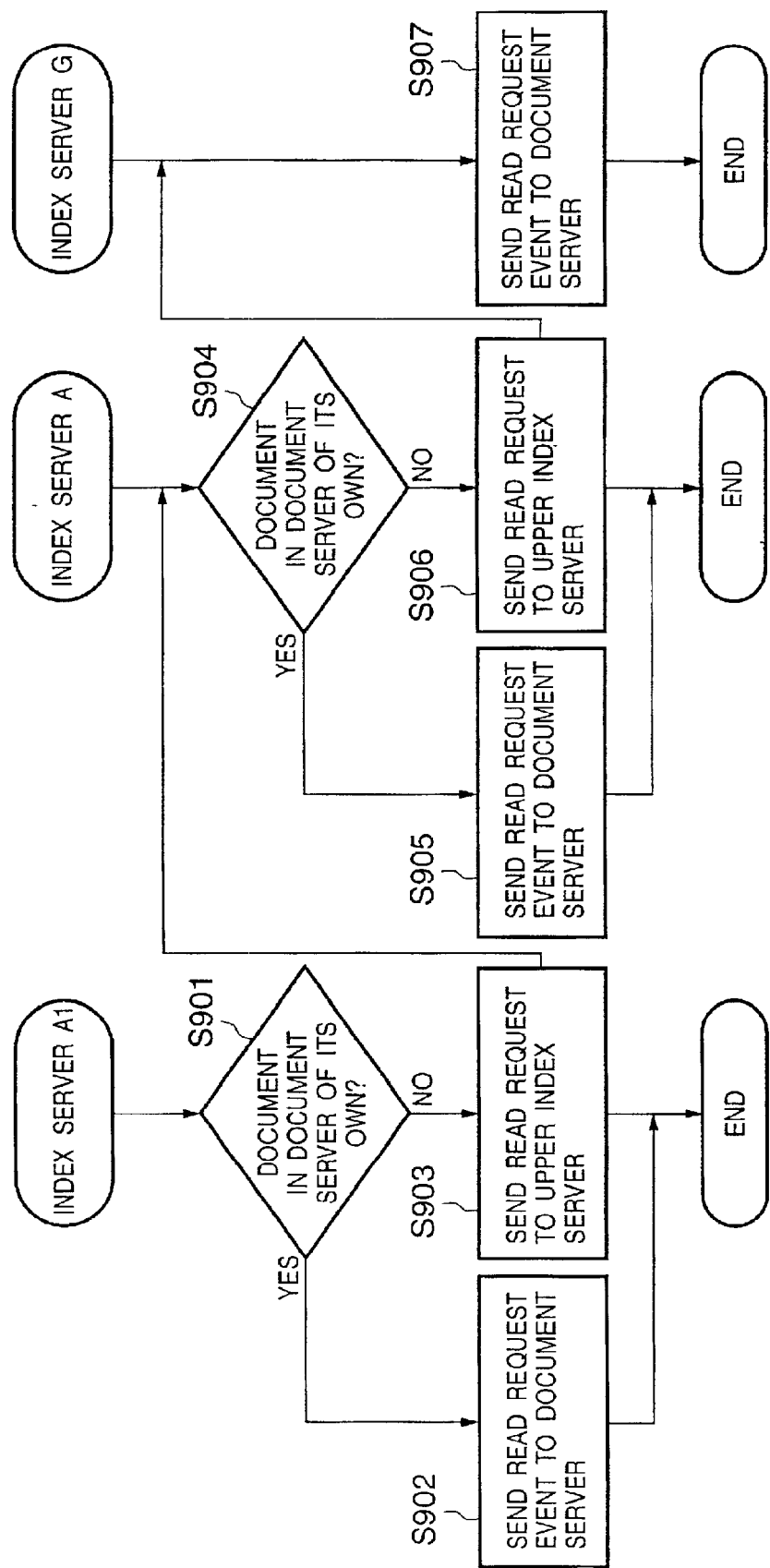
FIG. 9 is a flow chart showing document read processing in step S708 and other index server processing related to the document read processing.

The document read processing in step S708 and other index server processing related to the document read processing will be described next with reference to the flow chart shown in FIG. 9. A case wherein the user computer issues a document acquisition instruction to the server group A1 and acquires a document stored in the document server G of the server group G will be described. This also applies to other cases.

For example, pieces of information as shown in FIG. 12A are attached to the document acquisition instruction sent from the user computer in the above-described step S707. The pieces of information shown in FIG. 12A contain the name of document to be acquired, the name of server which stores the document, information for specifying the user computer which has issued the acquisition instruction to request the document, an access code representing user's access authority, and the name of an index server en route. The index server en route means an index server through which the document acquisition instruction from the user computer passes before reaching the server group which stores the document. The column of the index server en route name is blank when the document acquisition instruction is sent from the user computer.

In step S901, the index server A1 that has received the document acquisition instruction from the user computer determines whether the document to be acquired is stored in the document server (A1) of its own by referring to the information shown in FIG. 12A. If YES in step S901, the flow advances to step S902 to send a document read request event to the document server A1.

If NO in step S901 (as in this example), the flow advances to step S903 to send a read request to the upper index server A. At this time, pieces of information shown in FIG. 12B are attached to the read request. In the information shown in FIG. 12B, the name (A1) of index server A1 is written in the column of en-route index server name of information in FIG. 12A as information representing that the document acquisition instruction has passed through the index server A1.

In step S904, the index server A that has received the document acquisition instruction from the index server A1 determines whether the document to be read is stored in the document server (A) of its own by referring to the information shown in FIG. 12B, as in step S901. If YES in step S904, the flow advances to step S905 to send a document read request event to the document server A.

If NO in step S904 (as in this example), the flow advances to step S906 to send a read request to the upper index server (G). At this time, pieces of information shown in FIG. 12C are attached to the read request. In the information shown in FIG. 12C, the name (A) of index server A is written in the column of index server en route name of information in FIG. 12B as information representing that the document acquisition instruction has passed through the index server A.

In step S907, the index server G that has received the document read request from the index server A refers to the information shown in FIG. 12C and sends the document read request event to the document server (G) of its own.

Figure 10:
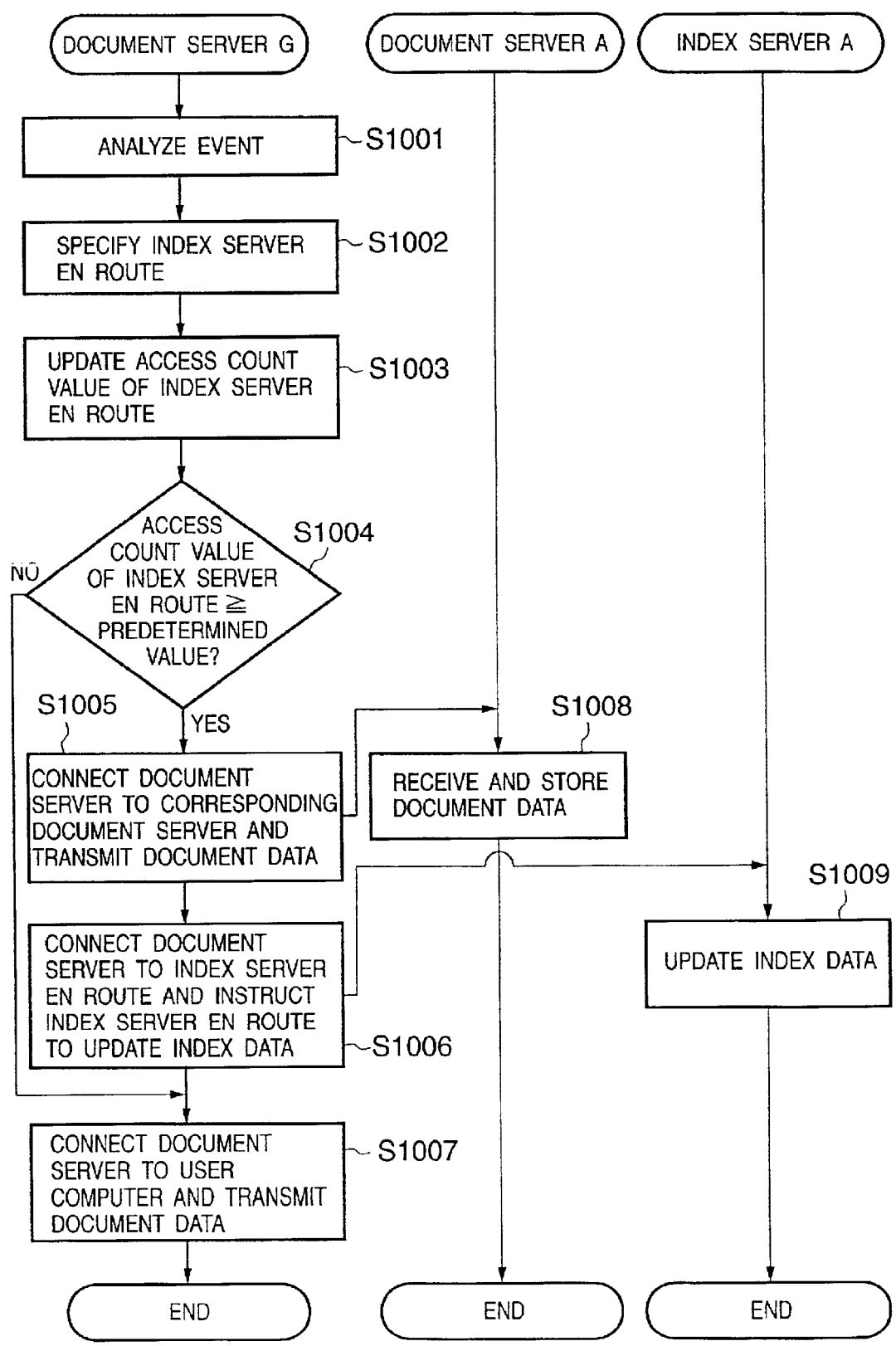
FIG. 10 is a flow chart showing processing in a document server that has received a read request event and other related servers.

Processing in the document server G that has received the document read request event from the document server G and other related servers will be described next with reference to the flow chart shown in FIG. 10.

In step S1001, the document server G analyzes the contents of the event received from the index server G and recognizes the event as a read request event. The document server can also determine whether the user has an access right to the requested document by referring to the information access code shown in FIG. 12C.

In step S1002, the index servers en route are specified. The index servers en route can be specified by referring to the column of index server en route name of information shown in FIG. 12C and checking the index servers through which the read request has passed. In this example, the index servers A1 and A are specified as index servers en route.

In step S1003, the access count values of the index servers en route specified in step S1002 are updated. The document server G stores access information representing the access count value. FIG. 13 is a view showing the access information. The access count value is numerical information which is incremented every time a read request is received (i.e., every time a document is transmitted to the user computer) for each index server en route, and is recorded for each document. That a server has a large access count value means that a number of read requests are issued for the same document. In this example, for the read-requested document, the access count values of the index servers A1 and A are incremented.

In step S1004, it is determined by referring to the access information shown in FIG. 13 whether the access count value of each index server en route exceeds a preset value. If NO in step S1004, the flow advances to step S1007. If YES in step S1004, the flow advances to step S1005.

In step S1005, the document server G is connected to the document server A corresponding to the index server A en route and transmits the document data to the document server A to copy the data of the read-accessed document to the document server A. In step S1008, the document server A receives the document data transmitted from the document server G and stores the data.

In step S1006, as the document data read-accessed is copied to the document server A, the index server G is connected to the index server A en route to instruct the index server A to update the index data. The index server A adds the index data of the document copied to the document server A in steps S1006 and S1008 and updates the index data.

In step S1007, the document server G is connected to the user computer that has issued the document acquisition instruction by referring to the column of request source of information shown in FIG. 12C and transmits the document data, and the processing is ended.

In this way, when a request for a document managed by the upper server group G is frequently issued from the lower server group A, the document data is copied to the server group A. After that, since the document data can be returned from the server group A to the user, load concentration can be avoided, and the user can extract the desired document data from the server group A with high access efficiency.

<Other Form of Document Read Processing>

In the above-described embodiment, the document acquisition request from the user computer to the server group G is sent through the index servers A1 and A. However, the document acquisition request can be directly sent from the user computer to the index server G or document server G. In this case, the information related to the index servers en route shown in FIG. 12C must be supplied from the user computer to the server group G.

Figure 8:
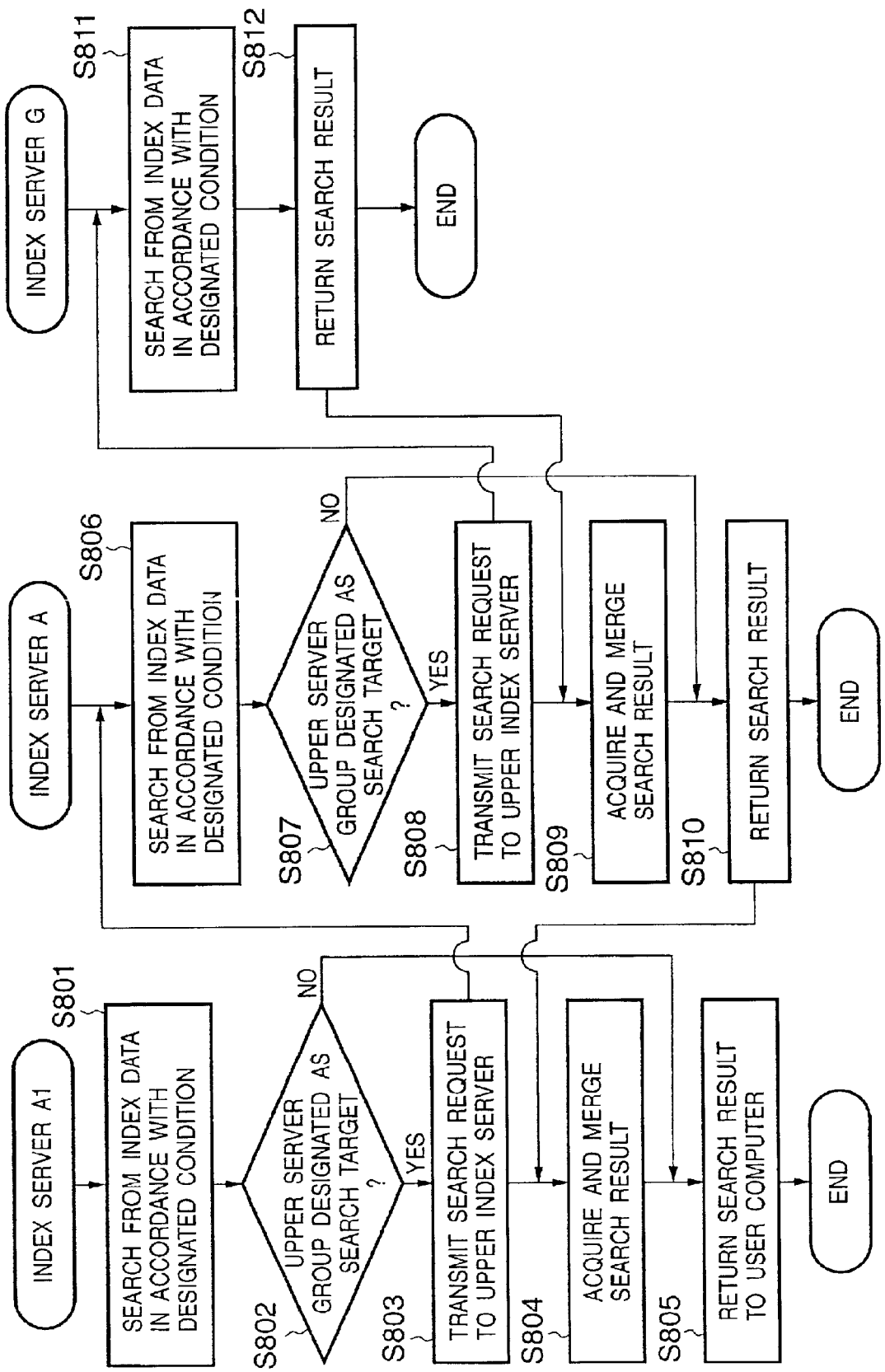
FIG. 8 is a flow chart showing search processing in step S704 of FIG. 7 and other index server processing related to the search processing.

To do this, for example, information representing index servers through which the search request is sequentially transmitted may be added to the search result returned to the user computer by search processing in FIG. 8 (step S805), thereby generating the information related to the index servers en route in the user computer.

Alternatively, information of server groups present between the user computer and each server group may be stored for each server group, and a server group that has received the acquisition request may determine the index servers en route. FIG. 18 is a view showing an example of the information. FIG. 18 shows information stored in the server group G. When a document acquisition request is received from the user computer belonging to the group A1, the index servers en route are servers A1 and A.

<Third Embodiment>

Figure 14:
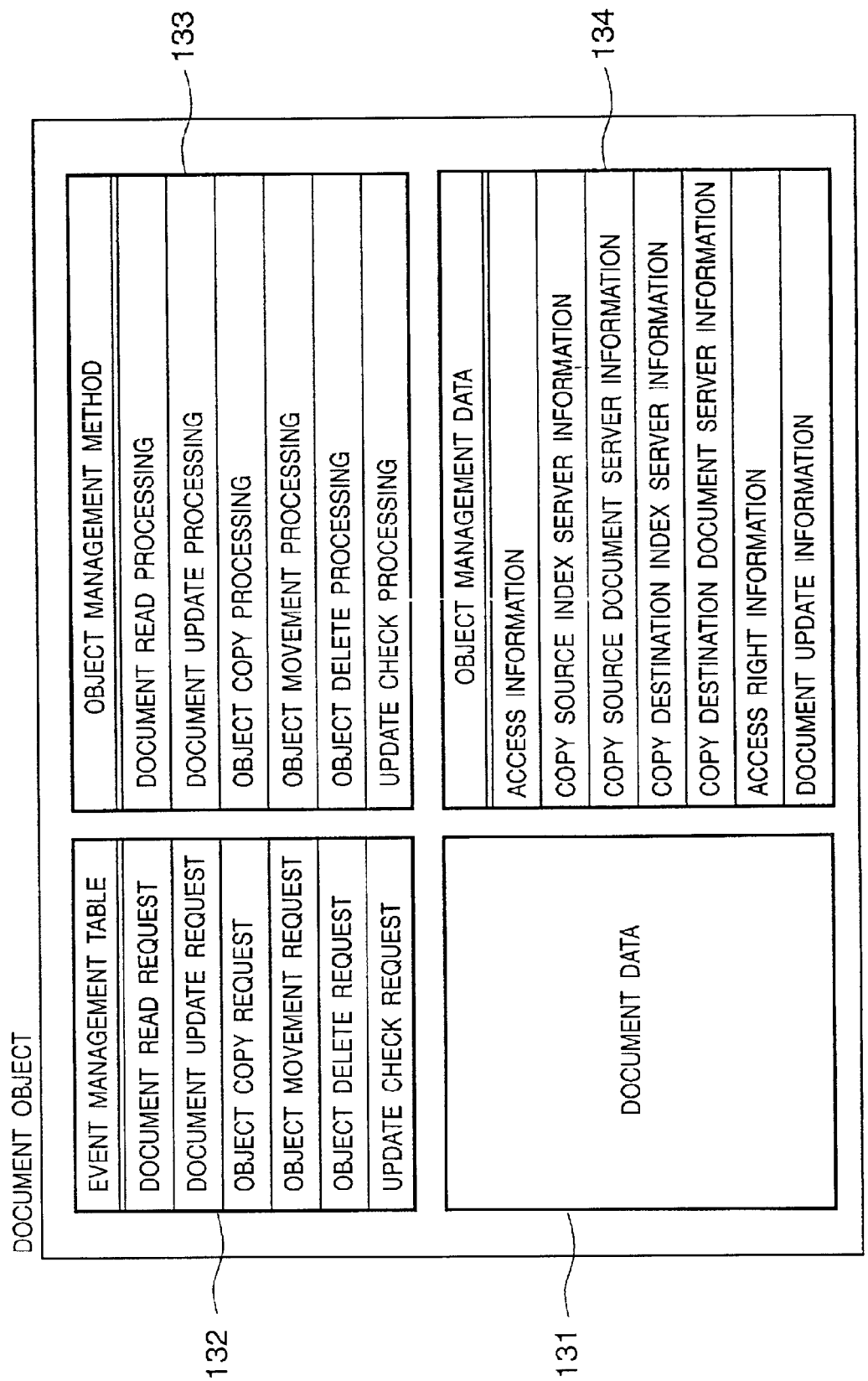
FIG. 14 is a view showing the structure of a document object.

In the above-described second embodiment, each document server stores only the contents of a document. However, a document may be stored in an object format. FIG. 14 is a view showing the structure of a document object which is generated for each document.

A document object includes document data (contents) 131, an object management method 133 in which a plurality of kinds of methods are defined, object management data 134 containing a plurality of kinds of data used by the object management method 133, and an event management table used to select a management method corresponding to an event transferred to the document object. In the object management method 133, various processes for a document are defined, and the program codes of the respective processes are stored.

Figure 11:
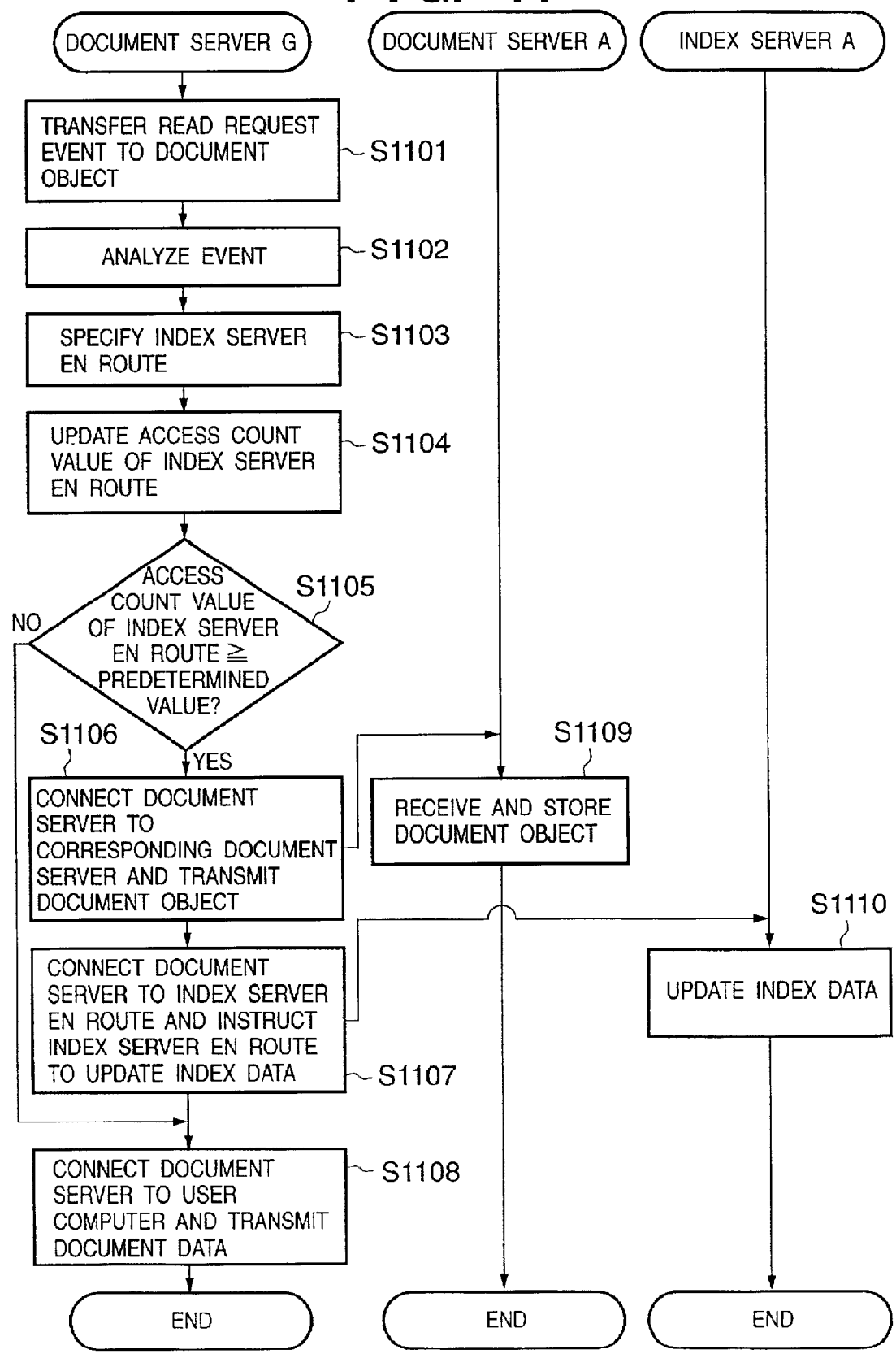
FIG. 11 is a flow chart showing processing in the document server that has received the read request event and other related servers when a document is managed in an object format.

For the above-described flow chart shown in FIG. 10, processing in a document server G that has received a document read request from an index server G and other related servers when the above document object is employed will be described next with reference to the flow chart shown in FIG. 11.

In step S1101, the document server G transfers an event received from the index server G to a read-requested document object. In step S1102, the contents of the event are analyzed. More specifically, document read processing in the management method 133 corresponding to the document read request is selected in accordance with an event management table 132 of the document object, and processing to be described below is executed.

In step S1103, index servers en route are specified. The processing is the same as in the above-described step S1002. In step S1104, the access count values of the index servers en route specified in step S1103 are updated. Each access count value is represented by access information of the object management data 134, e.g., the above-described information shown in FIG. 13.

In step S1104, it is determined by referring to the access information shown in FIG. 13 whether the access count value of each index server exceeds a preset value. If NO in step S1104, the flow advances to step S1108. If YES in step S1104, the flow advances to step S1106.

In step S1106, object copy processing in the object management method 133 is selected, and the following processing is executed. The document server G is connected to the document server A corresponding to the index server A en route. In addition, to copy the document object of the read-requested document to the document server A, the server G is recorded in the copy source document server information and copy source index server information in the object management data 134, and then, the document object is transmitted to the document server A. The document server (A) at the copy destination is recorded in the copy destination document server information of the object management data 134 of the document data of its own. In step S1109, the document server A receives the document object transmitted from the document server G and stores the document object.

In step S1107, as the document object of the read-requested document is copied to the document server A, the document server G is connected to the index server A en route to instruct the index server A to update the index data. The index server (A) at the copy destination is recorded in the copy destination index server information of the object management data 134. The index server A adds the index data of the document object copied to the document server A in steps S1106 and S1109 and updates the index data.

In step S1108, by document read processing in the object management method 133, the document server G is connected to the user computer that has issued the document acquisition instruction by referring to the column of request source of information shown in FIG. 12C, and transmits the document data (contents) from the document object, and the processing is ended.

When processing for the access count value and the like is executed not in accordance with a single program for managing the document server but in a form of event processing for a document object, the load on the document server can be reduced. For example, even when the number of documents managed by the document server increases, and the quantity of access information shown in FIG. 13 enormously increases, the information need not be managed by the program of the document server, so the load on the document server can be reduced. Even when data in the document server is partially destroyed, the data can easily be restored because various pieces of information related to the documents are stored for the respective objects.

In the above-described third embodiment, the document acquisition request is sent from the user computer to the server group G through the index servers A1 and A. However, in the third embodiment as well, the document acquisition request may be directly sent from the user computer to the index server G or document server G using the same method as described in the section <Other Form of Document Read Processing> of the second embodiment. In this case, the information shown in FIG. 18 may be added to the object management data 134 of each document object.

<Document Update Processing>

In the third embodiment, a document object is copied and stored in a plurality of document servers. When the document at the copy source is updated by the user, the updated contents are preferably reflected on documents at the copy destinations to update the documents at the copy destinations.

Figure 15:
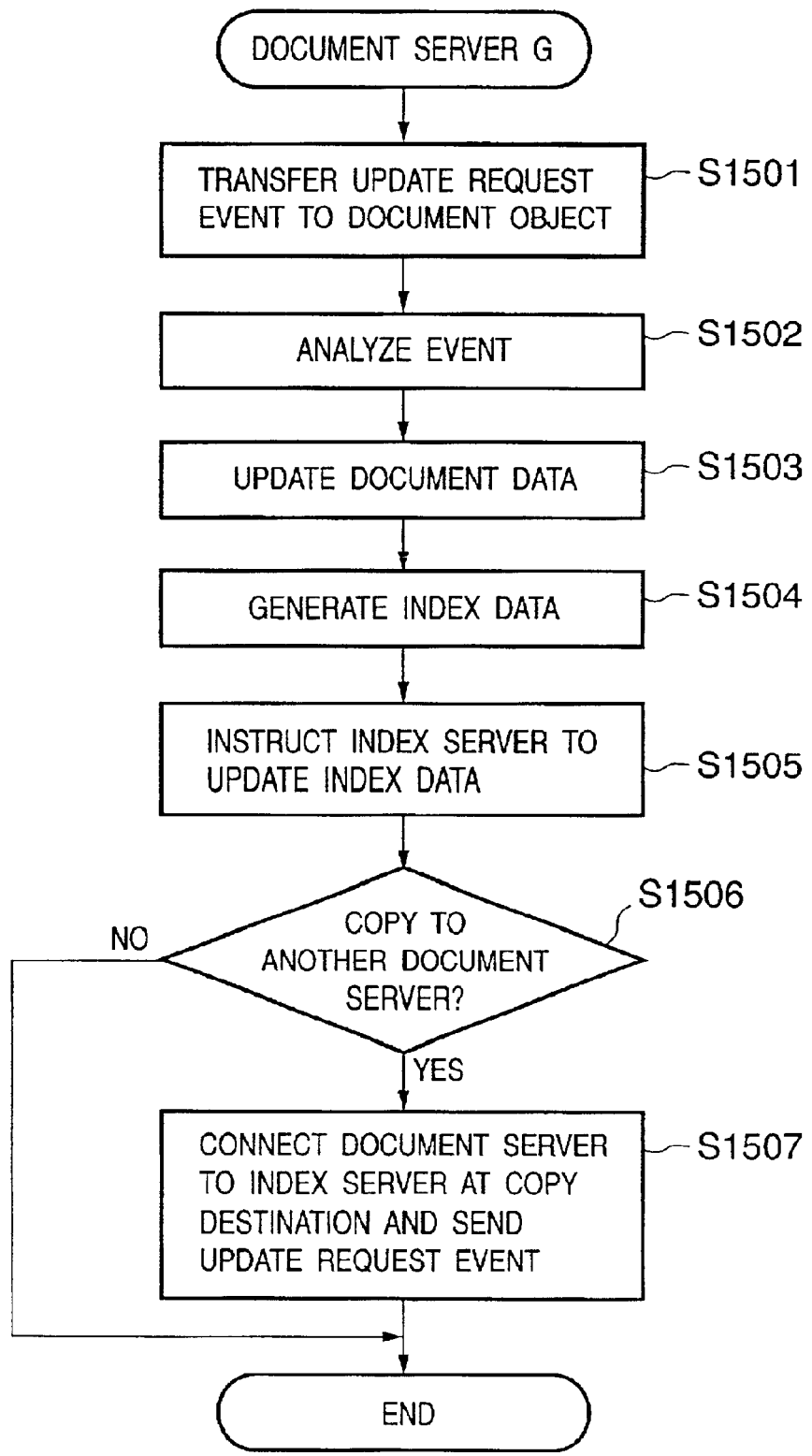
FIG. 15 is a flow chart showing processing in a document server when a user instructs the server to update a document at a copy source.

FIG. 15 is a flow chart showing processing in the document server when a user instructs the server to update a document at the copy source. This will be described below by exemplifying the document server G.

In step S1501, the document server G transfers an update request event received from the index server G to the update-requested document object. In step S1502, the contents of the event are analyzed. More specifically, document update processing in the object management method 133 corresponding to the document update request is selected, and the following processing is executed.

In step S1503, the document data is updated in accordance with the update request. In addition, data of the update date and the like are recorded in the document update information of the object management data 134.

When the document data is updated, the document name or keyword may be required to change. In step S1504, new index data for the document object is generated. In step S1505, for the index server (G) corresponding to the document server G, the update instruction is transmitted to the index server G together with the index data generated in step S1504 to cause the index server to update the index data.

In step S1506, it is checked whether the update-requested document object has been copied to another document server in the past by referring to the copy destination document server information in the object management data 134. If NO in step S1506, the processing is ended. If YES in step S1506, the flow advances to step S1507 to connect the document server to the document server at the copy destination to transmit the update request event for the document object. In the document server at the copy destination, the same processing as the above-described update processing is executed in accordance with the received update request event.

In this way, when the document at the copy source is updated, the update contents can be reflected on the document at the copy destination, and consistency between the documents can be maintained.

Figure 16:
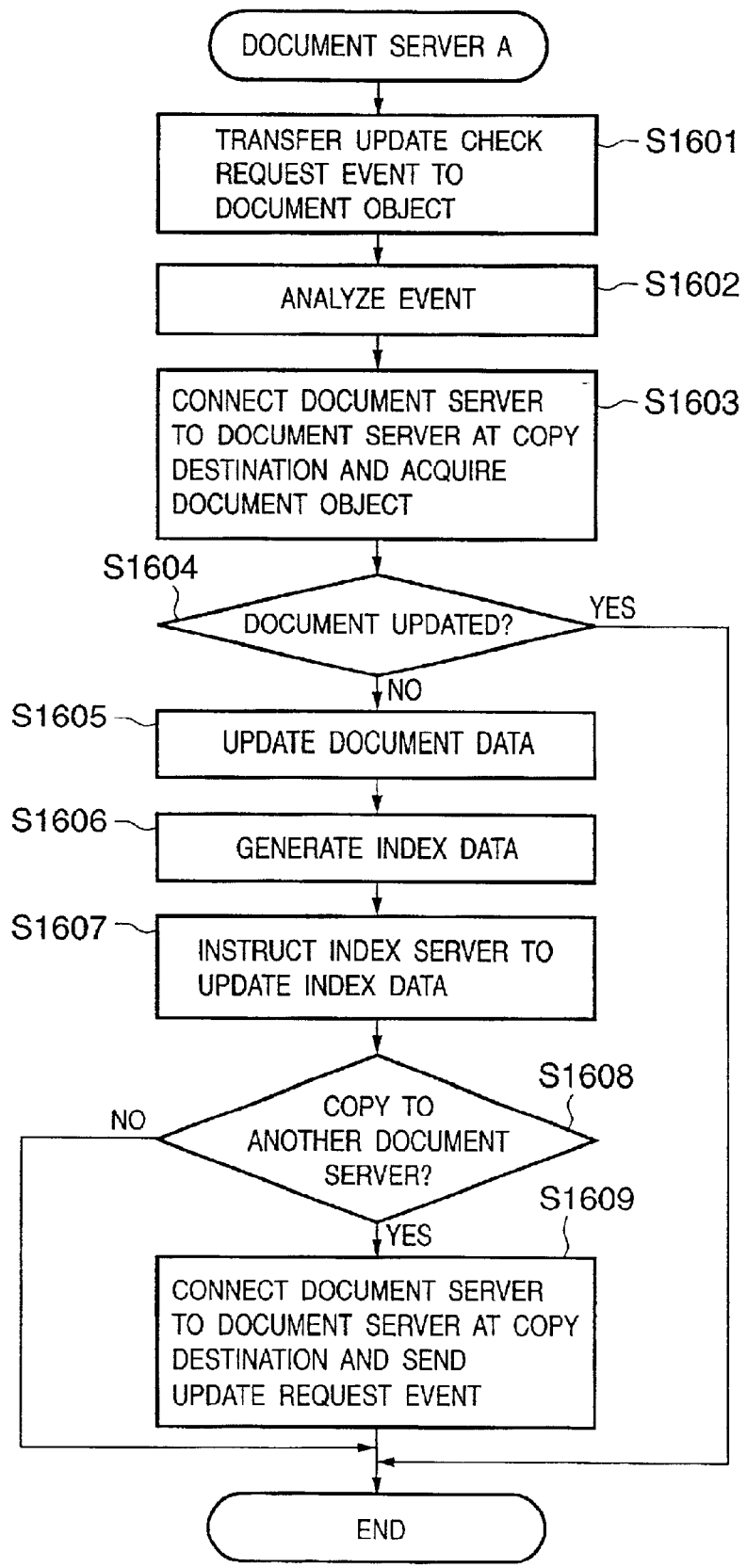
FIG. 16 is a flow chart showing document update check processing.

The above-described processing in FIG. 15 may fail because of temporary fault or malfunction of the system. To prevent mismatching between the documents, the document server at the copy destination may periodically access the document server at the copy source to check whether the document is updated. FIG. 16 is a flow chart showing the document update check processing. In this case, the document server A is the document server at the copy destination, and the document server G is the document server at the copy source.

In step S1601, the index server A transfers an update check request event to a document object for which update check is necessary. The update check request event is periodically issued. The update check request event may be issued by the document server A itself or the corresponding index server A.

In step S1602, the contents of the event are analyzed. More specifically, update check processing in the object management method 133 corresponding to the update check request is selected in accordance with the event management table 132 of the document object, and processing to be described below is executed.

In step S1603, the document server is connected to the copy source document server G of the document object for which update check is to be executed by referring to the copy source document server information of the object management data 134. In addition, a corresponding document object is acquired from the document server G.

In step S1604, it is checked whether the document data is updated by referring to the document update information of the object management data 134 of the document object acquired from the document server G. More specifically, the document update information of the document object in the document server A is compared with that of the document object acquired from the document server G to check whether the two pieces of information have a difference. If NO in step S1604, the processing is ended. If YES in step S1604, the flow advances to step S1605.

In steps S1605 to S1609, the same processing as in the above-described steps S1503 to S1507 is executed, and the processing is ended.

<Fourth Embodiment>

In the above-described third embodiment, a document is managed in the object format, and a document object is copied mainly between document servers. The access efficiency can be increased by deleting the document object at the copy source after copying, i.e., moving the storage position of the document object.

To do this, first, the document object managed by the upper server is copied to the lower server in accordance with the above-described procedure. For example, the index data in the upper index server and that in the lower index server are rewritten such that both index data indicates the document object in the lower document server. Then, the document object in the upper document server is deleted.

In this case, since the document is managed in the object format, pieces of information related to the document, like the object management data 134, are sent to the lower server at once as the document object is copied. Hence, processing is facilitated as compared to a case wherein all pieces of information are managed on the server.

<Fifth Embodiment>

Copy of a document object in the above-described third embodiment or movement of a document object in the fourth embodiment can be done in consideration of the number of times of request per unit time for data request from the user computer through another server, the size of data transferred to the user computer, the load on each server, the degree of margin of each server (e.g., remaining memory capacity), or the load or the degree of margin of the entire network.

For example, when a large number of document objects in the upper server group are copied or moved to the lower server group, and consequently, the load on the upper server group decreases, and the degree of margin increases, document objects which are rarely accessed in the lower server group may be moved into the document servers of the upper server group. For example, document objects whose access count values do not reach a predetermined value are moved. Such processing can be defined in the management method of each document object.

Pieces of information related to the number of times of request per unit time for a data request from the user computer through another server, the size of data transferred to the user computer, the load on each server, the degree of margin of each server (e.g., remaining memory capacity), or the load or the degree of margin of the entire network may be managed as log information, and data may be copied or moved on the basis of the log information. This form can also be applied to the first or second embodiment in which a document is not managed in the object format.

<Sixth Embodiment>

Figure 17:
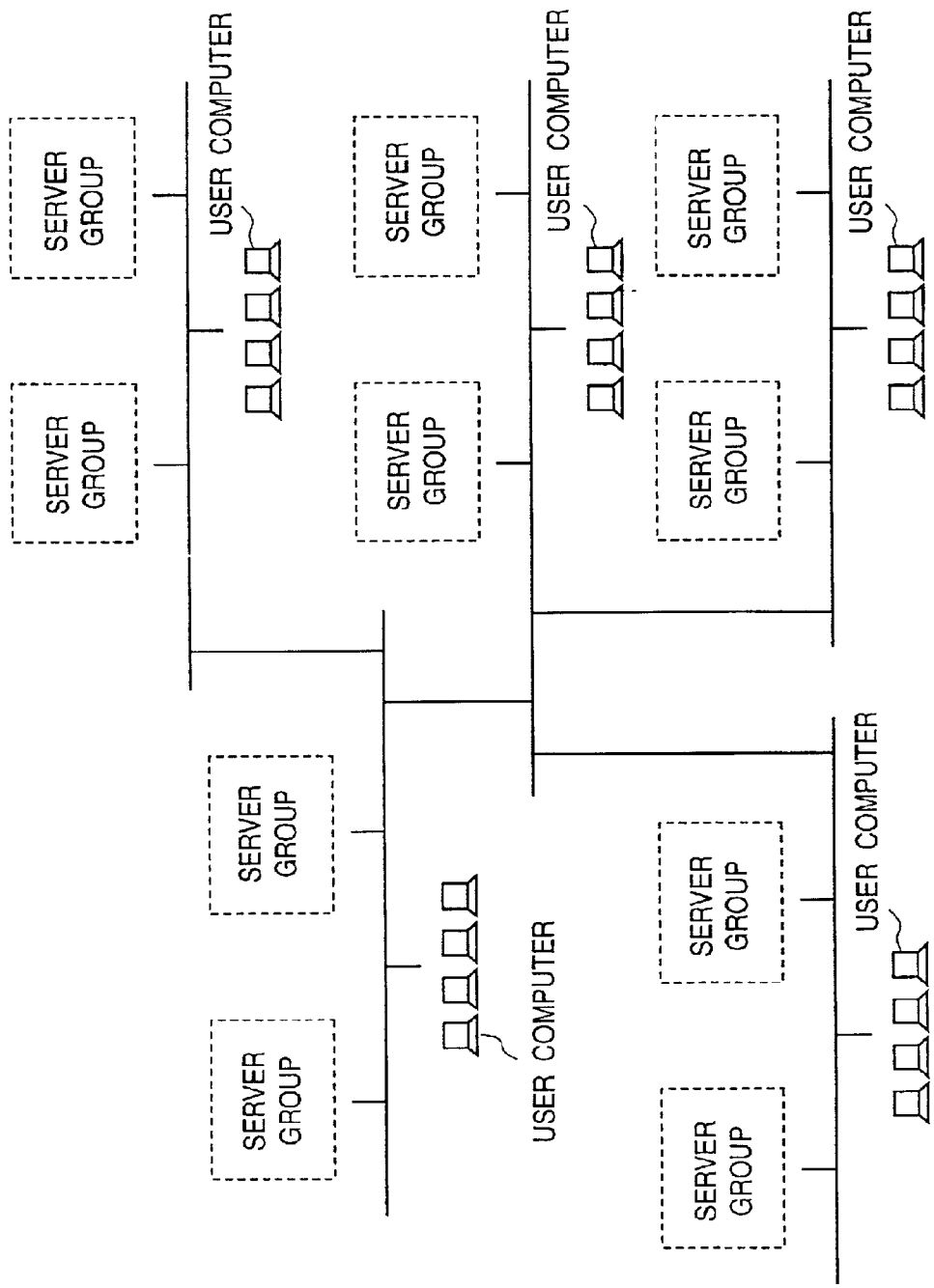
FIG. 17 is a schematic view of server groups which have a parallel structure.

In the above embodiments, the server groups have a hierarchical relationship. The present invention can also be applied to a parallel structure server group in which the server groups has a parallel relationship, as shown in FIG. 17.

In the parallel structure server group, when a user has authority to access a plurality of server groups, and desired data is not present in the closest server group, the search range is sequentially extended to server groups at remote positions on the network. When it is found that the desired data is present in a certain server group, the search is ended.

As a detailed application example, this structure is used to store or search for copyrighted data such as a music CD for which search data have individual IDs, and a unique result is obtained.

In this arrangement, specifying the server that manages a certain document is insignificant. The document can be moved to either server, and an index server also has a very simple structure. Hence, when data containing access information is held in a document object, as in this embodiment, a structure for determining the access efficiency and moving the data can be built even on such a simplified index server.

Preferred embodiments of the present invention have been described above. The object of the present invention can be achieved even by supplying a software program for implementing the functions of the above-described embodiments to a system or apparatus and causing the computer (or a CPU or MPU) of the system or apparatus to read out and execute the program.

In this case, the program itself implements the functions of the above-described embodiments, and the program, or a storage medium or program product that stores the program constitutes the present invention. The functions of the above-described embodiments are implemented not only when the readout program codes are executed by the computer but also when the operating system (OS) running on the computer performs part or all of actual processing on the basis of the instructions of the program codes.

The functions of the above-described embodiments are also implemented when the program codes read out from the storage medium are written in the memory of a function expansion card inserted into the computer or a function expansion unit connected to the computer, and the CPU of the function expansion card or function expansion unit performs part or all of actual processing on the basis of the instructions of the program codes.

As many apparently widely different embodiments of the present invention can be made without departing from the spirit and scope thereof, it is to be understood that the invention is not limited to the specific embodiments thereof except as defined in the appended claims.

What is claimed is:

1. A server which is connected to other server through a network and transfers data managed by the server in accordance with a request from a terminal, comprising:

recording means for recording the number of times of transfer of target data managed by the server, which is requested from the terminal through a second server, in association with the second server and the target data; and copy means for copying the data to the second server on condition that the number of times of transfer of the target data requested through the second server exceeds a predetermined number.

2. A server which is connected to another server through a network and tranfers data managed by the server in accordance with a request from a terminal connected to the other server, wherein the data is managed in an object format, the object contains the data, a management method, and management data, the server comprises means for executing processing defined in the management method, and the management method defines processing of recording the number of times of transfer of data managed by the server, which is requested from the terminal through a second server, as the management data in association with the second server and the data, and processing of copying the object of the data to the second server for which the number of times exceeds a predetermined number.

3. A program for causing a computer, which is connected to a second server through a network and tranfers data managed by the computer in accordance with a request from a terminal, to function as:
   recording means for recording the number of times of transfer of target data managed by the server, which is requested from the terminal through the second server, in association with the other server and the target data; and
   copy means for copying the target data to the second server on condition that the number of times of transfer of the target data requested through the second server exceeds a predetermined number.

4. A data management method of, for a plurality of servers connected through a network, transferring data managed by each server in accordance with a request from a terminal connected to the server, wherein:
   the data is managed in an object format,
   the object contains the data, a management method, and management data,
   the data management method comprises the step of executing processing defined in the management method, and
   the management method defines
      processing of recording the number of times of transfer of data managed by the server, which is requested from the terminal through a second server, as the management data in association with the second server and the data, and
      processing of copying the object of the data to the second server for which the number of times exceeds a predetermined number.

5. A data management method of, for a plurality of servers connected through a network, transferring data managed by each server in accordance with a request from a terminal, comprising:
   a recording step of, in each server, recording the number of times of transfer of target data managed by the server, which is requested from the terminal through a second server, in association with the other server and the data; and
   a copy step of copying the data to the second server on condition that the number of times of transfer of the target data requested through the second server exceeds a predetermined number.

6. The method according to claim 5, further comprising, in each server,
   the step of recording an index of the target data managed by the server, and
   the step of updating the index when the target data is copied.

7. The method according to claim 5, wherein
   the servers are hierarchically constructed on the network, and
   in the recording step in each server, the number of times related to a server on a lower side of the server is recorded.

8. The method according to claim 5, further comprising, in each server, the step of deleting the target data in the server after the target data is copied in the copy step.

9. The method according to claim 5, wherein the target data is document data.

10. The method according to claim 5, wherein the server is a server group formed from a data server which stores the target data, and an index server which stores an index of the target data.

11. A target data management system which has a plurality of servers connected through a network and tranfers data managed by each server in accordance with a request from a terminal connected to the server, wherein
   the data is managed in an object format,
   the object contains the data, a management method, and management data,
   each server comprises means for executing processing defined in the management method, and
   the management method defines
      processing of recording the number of times of transfer of data managed by the server, which is requested from the terminal through a second server, as the management data in association with the second server and the data, and
      processing of copying the object of the data to the second server for which the number of times exceeds a predetermined number.

12. The system according to claim 11, wherein the management method defines
   processing of, when the data managed by the server is updated, specifying the server at a copy destination of the object of the data, and
   processing of instructing the specified server at the copy destination to update the data.

13. The system according to claim 11, wherein the management method defines
   processing of specifying the server at a copy source of the object managed by the server,
   processing of acquiring the object from the specified server at the copy source,
   processing of determining whether the data of the acquired object is updated, and
   processing of, upon determining that the data is updated, updating the data of the object managed by the server on the basis of the data of the object acquired from the server at the copy source.

14. The system according to claim 11, wherein
   the servers have a hierarchical relationship, and
   the method defines
      processing of specifying the object of the data for which the number of times is smaller than the predetermined number, and
      processing of moving the specified object to an upper server.

15. A data management system which has a plurality of servers connected through a network and transfers data managed by each server in accordance with a request from a terminal, wherein each server comprises
   recording means for recording the number of times of transfer of target data managed by the server, which is requested from the terminal through a second server, in association with the second server and the target data, and
   copy means for copying the target data to the second server on condition that the number of times of transfer of the target data requested through the second server exceeds a predetermined number.

16. The system according to claim 15, wherein each server further comprises
   means for recording an index of the target data managed by the server, and
   means for updating the index when the target data is copied.

17. The system according to claim 15, wherein
the servers are hierarchically constructed on the network, and
said recording means of each server records the number of times related to a server on a lower side of the server.

18. The system according to claim 15, wherein each server further comprises means for deleting the target data in the server after the target data is copied by said copy means.

19. The system according to claim 15, wherein the target data is document data.

20. The system according to claim 15, wherein the server is a server group formed from a data server which stores the target data, and an index server which stores an index of the target data.

\* \* \* \* \*

UNITED STATES PATENT AND TRADEMARK OFFICE
CERTIFICATE OF CORRECTION

PATENT NO. : 6,879,982 B2
APPLICATION NO. : 09/875013
DATED : April 12, 2005
INVENTOR(S) : Akifumi Shirasaka It is certified that error appears in the above-identified patent and that said Letters Patent is hereby corrected as shown below:

Column 1,
Line 11, "large-scaled" should read -- large-scale --.

Column 3,
Lines 13, 32 and 51, "lowermost" should read -- the lowermost --.

Column 4,
Line 3, "lowermost" should read -- the lowermost --.

Column 6,
Line 62, "belongs to" should read -- belongs --.

Column 7,
Line 29, "search." should read -- a search. --.

Column 8,
Line 35, "as that" should read -- than that --.

Column 9,
Line 4, "search." should read -- a search. --; and
Lines 33, 46 and 67, "search" should read -- a search --.

Column 10,
Lines 3, 4, 8 and 9, "search" should read -- a search --;
Line 27, "document" should read -- the document -- and "server" should read -- the server --; and
Line 30, "user's" should read -- the user's --.

Column 15,
Line 56, "groups" should read -- group --.

Column 16,
Line 37, "other" should read -- another --; and
Line 50, "tranfers" should read -- transfers --.

UNITED STATES PATENT AND TRADEMARK OFFICE
CERTIFICATE OF CORRECTION

PATENT NO. : 6,879,982 B2
APPLICATION NO. : 09/875013
DATED : April 12, 2005
INVENTOR(S) : Akifumi Shirasaka It is certified that error appears in the above-identified patent and that said Letters Patent is hereby corrected as shown below:

Column 17,
Line 2, "tranfers" should read -- transfers --.

Signed and Sealed this

Twenty-seventh Day of June, 2006

JON W. DUDAS
*Director of the United States Patent and Trademark Office*